United States Patent [19]
Gruss

[11] 3,727,255
[45] Apr. 17, 1973

[54] NUT LOADING MEANS

[75] Inventor: Thomas J. Gruss, South Euclid, Ohio

[73] Assignee: Zager, Inc., Cleveland, Ohio

[22] Filed: Oct. 5, 1970

[21] Appl. No.: 78,031

[52] U.S. Cl. ............................10/162 R, 10/132
[51] Int. Cl. ...................B23g 1/20, B23g 11/00
[58] Field of Search.....................10/91, 130, 132, 10/155, 155 A, 162, 162 A, 165; 198/45; 214/8.5 F; 408/33, 34, 42, 43, 71; 221/166, 213

[56] References Cited

UNITED STATES PATENTS

| | | | |
|---|---|---|---|
| 2,333,940 | 11/1943 | Kuehlman | 10/155 |
| 2,802,224 | 8/1957 | Hillman | 10/162 |
| 2,802,526 | 8/1957 | Hillman | 10/162 |
| 2,972,759 | 2/1961 | Hillman | 408/34 |
| 3,015,832 | 1/1962 | Zagar | 408/43 |
| 3,103,023 | 9/1963 | Zdanis | 10/165 |
| 2,892,567 | 6/1959 | Smith et al. | 221/166 |
| 3,168,186 | 2/1965 | Young | 221/166 |
| 3,015,832 | 1/1962 | Zagar | 408/43 |

*Primary Examiner*—Charles W. Lanham
*Assistant Examiner*—E. M. Combs
*Attorney*—McNenny, Farrington, Pearne and Gordon

[57] ABSTRACT

Scores of open-centered nut blanks in planar array are to be simultaneously tapped by a multiple spindle tapping head fed by an intermittently advancing train of transfer segments each carrying a planar array of sockets. Nut blanks are loaded in the sockets at a loading station, one transfer segment being loaded during each intermittent advance of the train. The nut blanks are delivered to a plurality of pick-off holders above the train at the loading station. The pick-off holders comprise side-leaf and top leaf gripping members. The blanks are held forwardly tipped in the feed direction of the train. Prior to receipt of nut blanks, the sockets forming the planar array are penetrated by fingers that are arranged in a corresponding finger array. During the ensuing advance of the segment, together with the fingers, the forwardly tipped nut blanks are engaged on their rearwardly facing undersides by the fingers and are picked off the holders and guided into the sockets. Each holder is immediately refilled and a number of nut blanks are successively picked off from each pick-off holder during the loading of a single transfer segment. Penetration of the sockets of a particular segment by the fingers is terminated prior to tapping of the nut blanks associated with such segment.

10 Claims, 10 Drawing Figures

3,727,255

INVENTOR.
THOMAS J. GRUSS
BY
McNENNY, FARRINGTON,
PEARNE & GORDON
ATTORNEYS

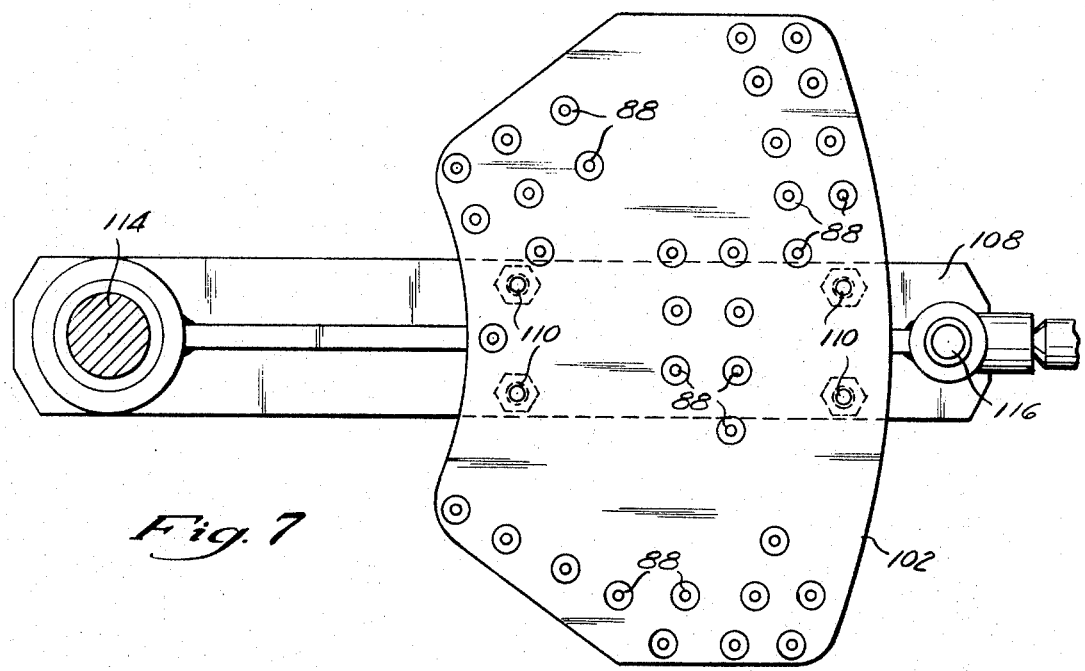
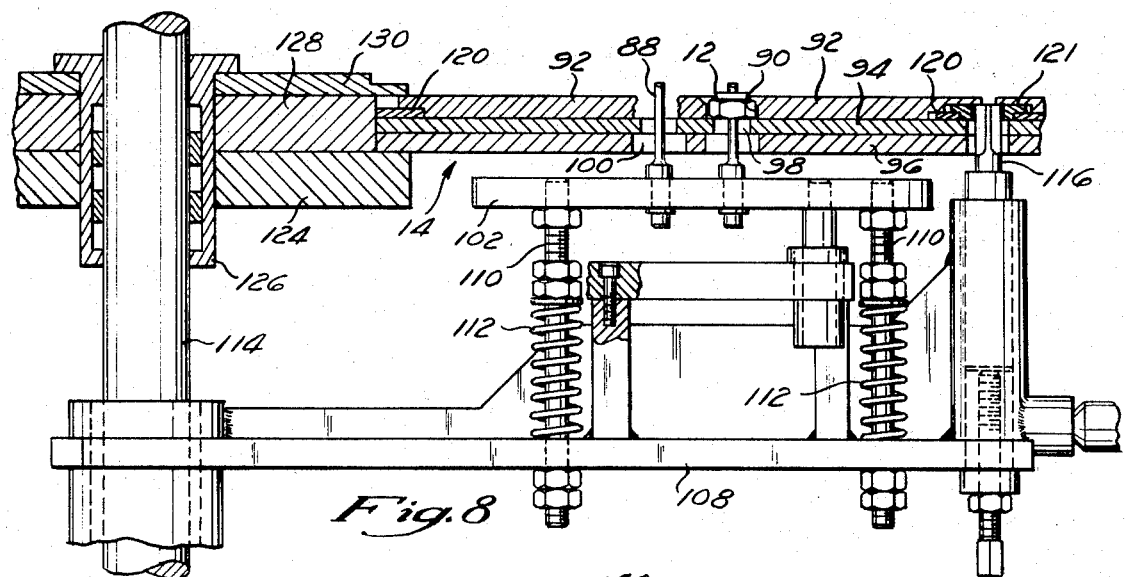
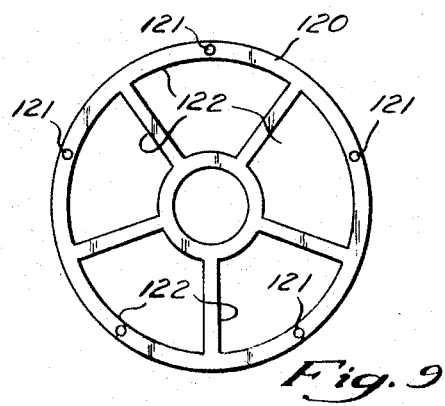
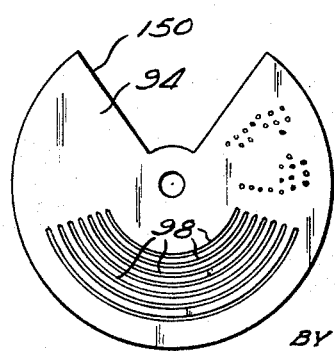

NUT LOADING MEANS

FIELD OF THE INVENTION

The present invention relates to feed-loading devices for multiple spindle machines wherein a multiplicity of workpieces are simultaneously worked and, more particularly, to a novel and improved feed-loading device which continuously provides such workpieces in a predetermined orientation. Although the present invention relates to feed-loading devices for multiple spindle machines generally, it shall hereinafter be described with particular reference to a multiple spindle nut tapping machine.

BACKGROUND OF THE INVENTION

The advent of multiple spindle tapping machines wherein scores of workpieces or nut blanks are simultaneously tapped has created a need for high capacity feed-loading devices. In many instances, it is also necessary for the feed-loading device to accurately arrange the nut blanks in a predetermined longitudinal orientation to effectuate proper tapping. Consequently, the efficiency as well as the output of such multiple spindle machines is directly related to the capabilities of the feed-loading device which is employed.

An example of such a multiple spindle tapping machine is provided in U.S. Pat. No. 3,015,832 granted Jan. 9, 1962, the disclosure of which is hereby incorporated by reference. The multiple spindle machine there disclosed is substantially identical in its essential features to that discussed herein. Thus, the multiple spindle machine includes a platform means which supports an endless train of intermittently advanced transfer segments. Each of the transfer segments defines an array of scores of workpiece or nut blank receiving sockets which are loaded with workpieces or nut blanks at a loading station. The segment is advanced to a working station where the tapping operation is performed. During the tapping operation, the transfer segment, having the workpieces in the sockets thereof, and a multiple spindle tap head are moved together. Thereafter, the tap head and segment are moved apart and the segment is advanced to an unloading station where the tapped workpieces are unloaded.

As described in said prior U.S. Pat. No. 3,015,832 such a multiple spindle tapping machine achieves an output of 50,000 to 100,000 units per hour while employing desirably low tap speeds in the range of 600 r.p.m. The feed loading device there disclosed includes a random dispersion of the nut blanks on the transfer segment at the loading station. A rotating brush is provided to sweep the nut blanks into the sockets as the segment advances beneath the brush. Although the brush feed-loading device is adequate, it is not entirely satisfactory for a number of reasons set forth below in detail.

The brush feed-loading device is not suitable for workpieces or nut blanks having different upper and lower configurations. In particular, the brush feed is not satisfactory when a nut blank has one of its axial ends beveled or tapered since the feed device nondiscriminately sweeps the nut blanks into the sockets without proper orientation of the upper and lower configurations thereof. Furthermore, the brush feed device does not reject improperly sized or misshapen nut blanks. For example, a nut blank having an improper bevel or no bevel at all is not rejected.

The brush feed device is also somewhat unsatisfactory in that it may not insure the full potential of the machine. In particular, since the brush feed operates on a hit or miss basis, a number of the workpiece-receiving sockets may not be loaded and the total output of the machine is thereby reduced. Although the percentage of unloaded sockets is relatively low, it becomes more significant as the output of the machine is increased. For example, a high capacity multiple spindle machine having an output of 200,000 units per hour may have its total daily output reduced by 80,000 units when only 5 percent of the sockets fail to be loaded.

SUMMARY OF THE INVENTION

The present invention provides a feed-loading apparatus for providing successive planar arrays of workpieces or nut blanks for presentation at and subsequent removal from a work station at which the workpieces are simultaneously worked. The feed-loading apparatus is designed to deliver such workpieces in a predetermined proper orientation for pick-off thereof at a loading station.

In the illustrated embodiment, the apparatus includes conveyor track means for orientating and aligning the workpieces and guideway means to deliver such oriented workpieces to a plurality of pick-off holders at the loading station. The pick-off holders releasably retain the workpieces in a forwardly tipped attitude a predetermined distance above an endless train of intermittently advancing transfer segments which define an array of workpiece-receiving sockets. The workpieces are picked off and guided into the workpiece-receiving sockets by fingers which penetrate through the sockets. An array of such fingers associated with the loading station and corresponding to the array of sockets is provided. Prior to the working of the workpieces, the fingers are withdrawn from the sockets. The loading operation is repetitive and the pick-off holders continuously replace each workpiece as it is picked off by one of the fingers.

The feed-loading apparatus of the present invention substantially eliminates the problems encountered in the prior art as set forth above. The disclosed apparatus is suited for loading workpieces having different upper and lower configurations in contrast to the prior art device. Thus, the disclosed apparatus is more versatile since it may be used with longitudinally non-symmetrical workpieces.

The disclosed feed-loading device ensures that the full output capacity of the multiple spindle machine is achieved by positively providing a properly oriented workpiece in each of the workpiece sockets. As indicated above, this is especially important where relatively higher output machines are employed.

In addition, improperly sized or misshapen workpieces as well as a foreign material which inadvertently enters the feed supply are rejected during the orientation of the workpieces. Consequently, production time is not wasted working on improperly sized or misshapen workpieces which must be subsequently rejected upon inspection. Similarly, the possibility of jamming due to an improperly oriented or sized workpiece or foreign material is substantially reduced by the feed-loading apparatus of the present invention.

BRIEF DESCRIPTION OF THE DRAWINGS

FIG. 7 is a plan view of indexing means and fingers which are employed with the train of workpiece-receiving sockets illustrated in FIG. 1;

FIG. 8 is a side elevational view of the indexing means and fingers shown in FIG. 7, and a sectional view of a portion of the platform means on which the train of workpiece-receiving sockets is supported;

FIG. 9 is a plan view on a reduced scale of a portion of the platform means shown in FIG. 8; and FIG. 10 is a plan view on a reduced scale of another portion of the platform means shown in FIG. 8.

DETAILED DESCRIPTION OF THE DRAWINGS

Figure 1:
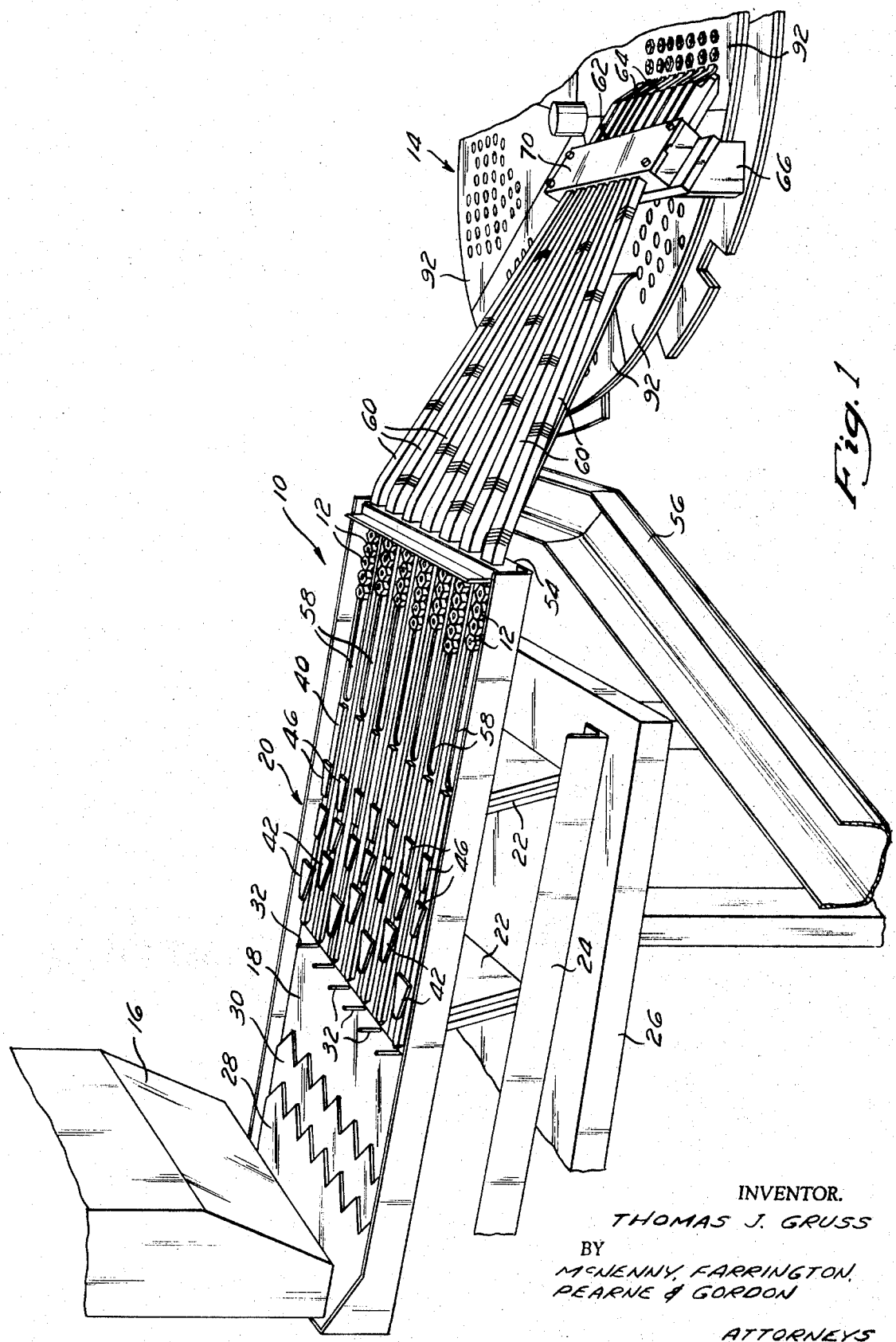
FIG. 1 is a perspective view of a feed-loading apparatus delivering nut blanks to an array of workpiece-receiving sockets according to the present invention.

Referring to FIG. 1, there is shown a feed-loading apparatus 10 for orientating, aligning, and delivering workpieces or nut blanks 12 to a platform means 14. The platform means 14 is part of a multiple spindle nut tapping machine which is substantially identical to that disclosed in applicant's patent referred to above.

A hopper 16 is positioned at one end of the apparatus 10 for randomly dispersing the nut blanks 12 onto a pan 18. The pan 18 extends to a conveyor track 20 along which the nut blanks 12 travel. The pan 18 and the track 20 are sloped slightly downwardly toward the platform means 14. Vibrator means (not shown) are provided for the movement of the nut blanks along the pan and conveyor track toward the platform means 14. To that end, the pan 18 and the track 20 are mounted on vibrating members 22 which are connected to an angle support 24. The angle support 24 is mounted on suitable support means such as table 26.

The pan 18 includes raised surfaces 28 and 30 to facilitate the initial movement of the nut blanks 12. Further, the pan is provided with guide pins 32 which aid in directing the nut blanks from the pan 18 to the conveyor track 20.

Figure 2:
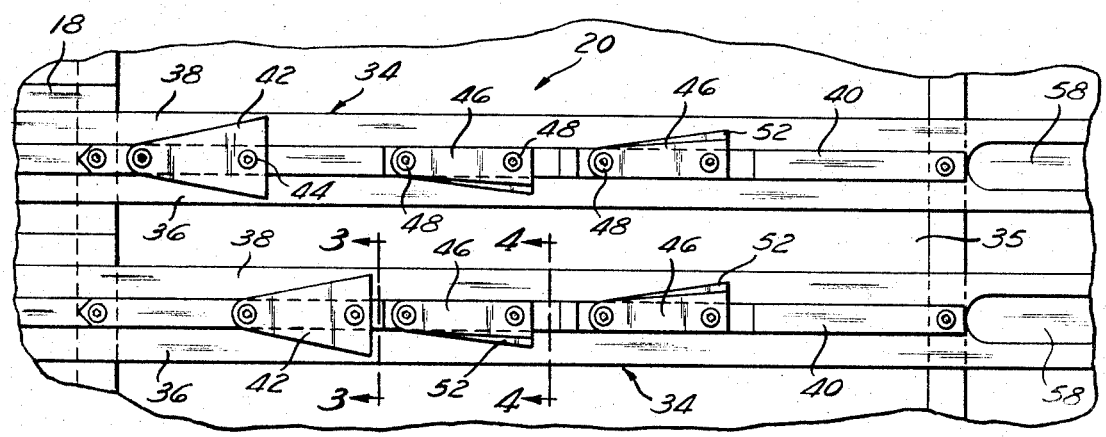
FIG. 2 is an enlarged, fragmentary plan view of the apparatus illustrated in FIG. 1, showing conveyor track means and gate means for orienting and aligning the nut blanks.
Figure 3:
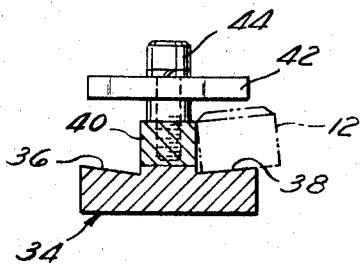
FIG. 3 is a sectional view of the conveyor track means and first gate means shown in FIG. 2, the plane of the section being indicated by the line 3—3.
Figure 4:
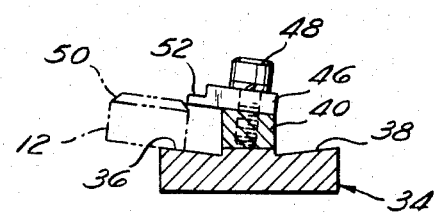
FIG. 4 is a sectional view of the conveyor track means and second gate means shown in FIG. 2, the plane of the section being indicated by the line 4—4.

As best shown in FIGS. 2 through 4, the conveyor track 20 comprises a plurality of laterally spaced apart tracks 34. Thus, an opening or space 35 is provided at each side of the tracks 34. The opening 35 is dimensioned to permit passage therethrough of a workpiece or nut blank 12. Each of the tracks 34 is substanitally similar and includes first and second slide surfaces 36 and 38 respectively. The slide surfaces 36 and 38 are separated by a raised mounting bar 40 which vertically projects between the slide surfaces.

Each of the slide surfaces 36 and 38 is sloped downwardly towards the raised mounting bar 40. The nut blanks 12 travel along the slide surfaces in a cantilever-type arrangement wherein a portion of each of the nut blanks laterally overhangs the supporting slide surface. This is best shown in FIGS. 3 and 4 wherein the nut blank is illustrated in phantom outline.

At an upstream position along each of the conveyor tracks 34, there is provided a first gate means or guide plate 42. The guide plate 42 is centrally mounted in the mounting bar 40 and is vertically spaced from the slide surfaces 36 and 38. The guide plate is secured to the mounting bar by bolts 44. The guide plate 42 extends over the slide surfaces and cooperates therewith to provide a profile having a vertical extent which is less than the lateral dimension of a properly orientated nut blank. Thus, a properly orientated nut blank 12 passes beneath the guide plate 42 without interference. However, an improperly orientated nut presents a dimension of vertical extent greater than the spacing between the guide plate and the slide surface. Consequently, such a nut blank is deflected by the guide plate 42 into a proper orientation or discharged from the slide surface into the space 35. In this manner, the gate means or guide plate 42 permits the passage of nut blanks 12 having their lateral dimension extending in the proper orientated direction.

A second gate means or guide plate 46 is provided further downstream in the direction of travel of the nut blanks 12 to further insure proper orientation thereof. Each guide plate 46 is secured to its mounting bar 40 by bolts 48. Each guide plate 46 cooperates with a slide surface to define a distance which is less than a portion of the vertical extent of the surface configuration of an improperly oriented nut blank but which is greater than the vertical extent of a portion of the surface configuration of a properly oriented nut blank.

For example, as shown in FIG. 4, the nut blank 12 having an upper surface configuration characterized by a bevel or taper 50 is permitted to pass along the slide surface 36 since the vertical extent of the bevel or taper 50 is less than the spacing between the guide plate 46 and the slide surface 36. However, if the nut blanks were rotated 180° to an inverted position, the lower extremity of the nut blank would be adjacent the guide plate 46 and interfere therewith. In this instance, the interference between the guide plate and the nut blank would result in the discharge of the nut blank from the track into the space 35.

The overhanging extremity of the guide plate 46 is provided with a step 52. In this manner, the guide plate 46 is adapted to insure proper orientation of the two different types of nut blanks having dissimilar axial extents. In particular, the guide plate may be installed and used as illustrated in FIG. 4 or it may be installed so as to place the step 52 facing the slide surface to insure proper orientation or larger nuts.

The nut blanks 12 which are discharged from the track 34 into the spaces 35 are caught within a lower pan 54 (FIG. 1) which is mounted below and secured to the conveyor track 20. The pan 54 collects and guides the discharged nut blanks 12 to a return trough 56. The discharged nut blanks are subsequently recycled into the hopper 16 by any suitable means (not shown).

The oriented nut blanks 12 are subsequently arranged in a plurality of single file rows. To that end, each of the pairs of slide surfaces 36 and 38 converge and deposit the oriented nut blanks within a slide recess 58. Adjacent the point of convergence, the raised mounting bar 40 is terminated and the slide recess 58 is provided between the slide surfaces. In the illustrated embodiment, there are seven such single file rows. Of course, the number of rows may be increased or decreased in accordance with the particular multiple spindle machine operation requirements.

Each of the slide recesses 58 terminates at and deposits the orientated nut blanks in an associated guideway or chute 60. The chutes 60 are provided with a flexible structure and may be formed of any suitable material such as coiled spring metal. The flexible structure of the chutes 60 is adapted to accommodate the vibratory movement of the pan 18 and the conveyor track 20 and to accommodate vertical movement of the platform means 14 as will hereinafter become apparent. The chutes 60 are dimensioned to guide the nut blanks to a forwardly inclined pick-off battery 62 located adjacent a loading station without disorientation of the nut blanks.

Figure 5:
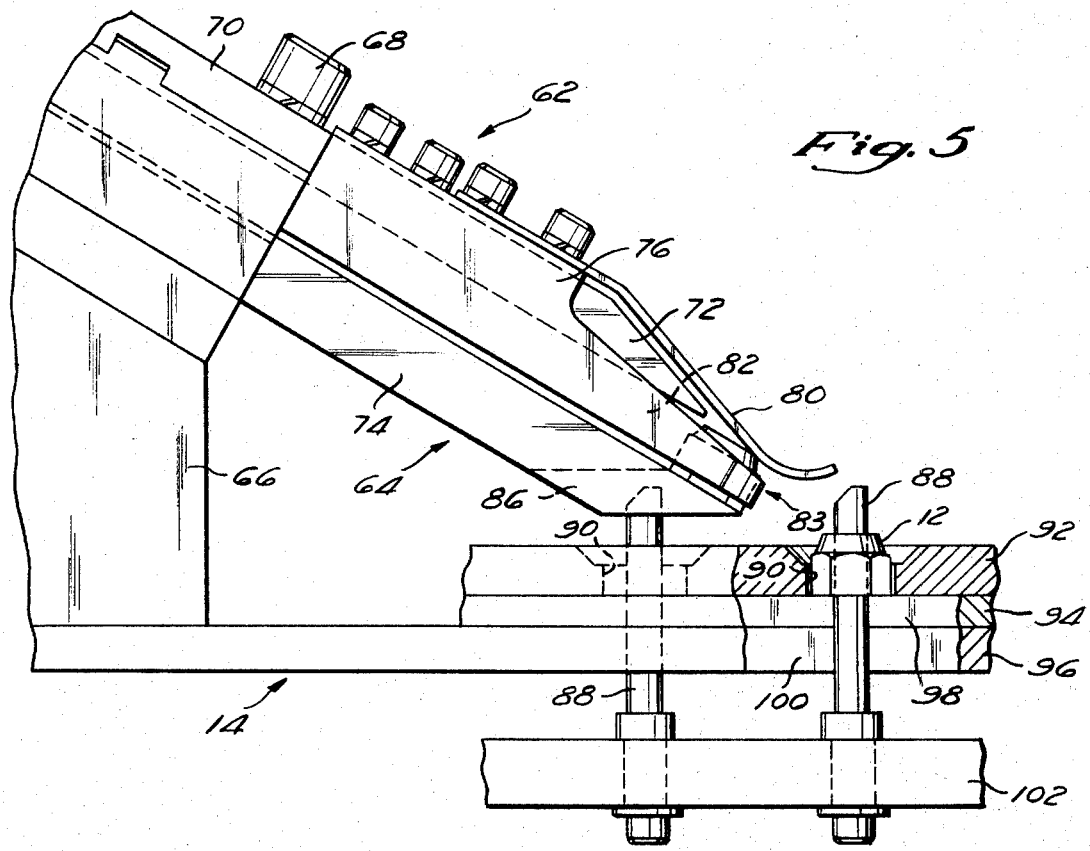
FIG. 5 is a fragmentary, side elevation partially in section and on an enlarged scale of a pick-off holder, workpiece-receiving sockets, and fingers.
Figure 6:
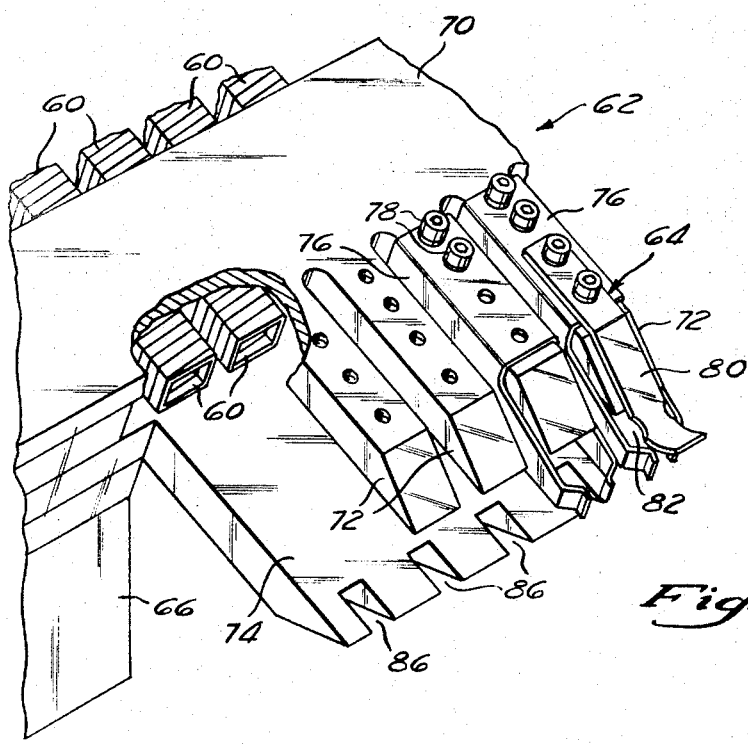
FIG. 6 is a perspective view of the pick-off holder shown in FIG. 5 with parts broken away and omitted for clarity.

As shown in FIGS. 5 and 6 the pick-off battery 62 provides a plurality of pick-off holders 64 each of which is associated with one of the chutes 60. The pick-off battery 62 is supported in a fixed position, a predetermined distance above the platform means 14. To that end, a support member 66 extends from the platform means 14 to the pick-off battery 62 and is connected thereto by any suitable means such as the bolt 68.

The pick-off battery 62 includes a top guide plate 70 having a plurality of guide-fingers 72 projecting therefrom. Each of the guide-fingers 72 is aligned with one of the chutes 60. Thus, as the nut blanks 12 are delivered by the chutes 60 they pass directly beneath the guide-finger 72 associated with the particular chute. As the nut blanks 12 are delivered by a chute 60, they are received on and travel along a bottom guide plate 74 which is spaced a predetermined distance from the top guide plate 70.

Each of the guide fingers 72 is provided with a side-leaf spring gripping member 76 which is secured thereto by bolt 78. Each of the side-leaf spring gripping members has an inverted "U" shape which is designed to fit over its associated guide-finger. The legs of the gripping member extend towards the bottom guide plate 74 and terminate adjacent thereto. In addition, each of the guide-fingers 72 is provided with a top-leaf spring gripping member 80 which extends beyond the forward extent of the guide-finger 72 and converges with the side-leaf spring gripping members 76.

The guide plates 70 and 74 and the leaf spring gripping members 76 and 80 cooperate to define forwardly inclined channels 82 through which the nut blanks 12 travel. Adjacent the forward most end of the inclined channel 82, the leaf gripping members converge and form escapement means for restraining the nut blanks 12 at a pick-off position generally indicated by the numeral 83. To that end, the side-leaf gripping members 76 define a restraining profile corresponding to a portion of the profile of the nut blank and the top-leaf gripping member 80 releasingly engages the upper portions of the nut blank.

The bottom guide plate 74 is provided with a plurality of slots 86 which are arranged to expose the open-centered undersides of the nut blanks 12 at the pick-off position. Each of the slots 86 is aligned with an associated inclined channel 82.

The nut blanks 12 are picked off by fingers 88 which are traveling from left to right as shown in FIG. 5. For purposes of illustration, only two such fingers 88 are shown in FIG. 5, however, an array of scores of such fingers associated with the loading station are provided. The fingers 88 travel through arcs of 72° and are arranged to engage and pick off the rearwardly facing open-centered undersides of the nut blanks and guide them into workpiece or nut blank receiving sockets 90. The workpiece-receiving sockets 90 are formed within each of a plurality of transfer segments 92. In the present invention and in accordance with the teachings of the above-mentioned patent, five segments 92 are provided and these segments are incrementally advanced through five stations. Each socket 90 is provided with an associated finger 88 which penetrates therethrough and picks off the forwardly tipped nut blanks. The socket-penetrating fingers are arranged to successively pass directly under the pick-off holders 64. The array of sockets 90 correspond to the array of fingers 88. As set forth in greater detail below, each transfer segment 92 is intermittently advanced through successive angular increments of 72° and the sockets 90 trace a plurality of concentric circles.

Each transfer segment 92 is guided along a non-rotating plate 94 by means which will hereinafter become apparent. The plate 94 is secured to and supported by a support plate 96. The plates 94 and 96 are provided with a plurality of arcuate channels 98 and 100 respectfully. The arcuate extent of each arcuate channel 98 and 100 is 144° to thereby accommodate the arcuate extent of the path of travel defined by the fingers 88. In this manner, the socket-penetrating fingers 88 may be advanced with the transfer segment 92 to a subsequent station where such penetration is terminated.

The fingers 88 are mounted on a shuttle plate 102 which is arranged to advance each transfer segment 92 to a subsequent penetration terminating station.

Referring to FIGS. 7 and 8, the shuttle plate 102 is mounted on an indexing arm 108 which is positioned below the platform means 14. The shuttle plate 102 is resiliently connected to the indexing arm by means of adjustable threaded shafts 110 and cooperating springs 112.

The shuttle plate 102 is resiliently mounted to permit sufficient movement in a vertical direction to prevent jamming if the platform means should accidentally engage the shuttle plate during a downward movement which will be explained in detail below.

The indexing function of the arm 108 in the multiple spindle machine, exclusive of the feed-loading apparatus disclosed herein, is set forth in detail in U. S. Pat. No. 3,015,832. The indexing arm 108 is rotatably mounted on a central guide post 114 for intermittent advancement of each transfer segment 92. To that end, the indexing arm 108 is provided with an upright pin 116 which engages an indexing socket or bushing 121 provided in an indexing plate 120.

The indexing plate is best shown in FIG. 9 and it includes five symmetrically located segment retaining apertures 122. Each of the apertures 122 is designed to receive a transfer segment 92 and carry such segment in sliding relationship with respect to the non-rotating plate 94 and its support plate 96 through the entire machine cycle. Accordingly, an indexing socket 121 is positioned adjacent each of the apertures for intermittent successive advancement of the indexing plate 120 through the cycle. The indexing plate 120 corresponds to the plate 135 in the aforementioned patent and in comparison to that patent, it should be noted that apertures 122 are employed as opposed to an array of holes corresponding to the array of sockets 90.

The stationary plate 94 and the support plate 96 are non-rotating and are affixed to a lead screw plate 124. The function of the lead screw plate is set forth below in greater detail, however, it should be noted that its function is essentially the same as that of the corresponding plate in the aforementioned patent.

The central guide post 114 extends through the platform means 14 and a suitable bushing 126 is provided to provide a sliding-guiding relationship. A central plate 128 is provided about the bushing 126 to guide the transfer segments 92 and the indexing plate 120 at the inner peripheries thereof. Additional guide means (not shown) such as adjustable guide lugs are provided for guidance of the outer peripheries. A cover disc 130 is provided for guidance of the transfer segment 92 adjacent the upper surfaces thereof.

As previously indicated, the platform means 14 is translatable in a vertical direction. To that end, the lead screw plate 124 is arranged in a screw jacking association between a stationary support means (not shown) are provided for the platform means 14. A plurality of lead screws (not shown) are provided for the vertical movement of the platform means 14. Suitable power means (not shown) are provided to intermittently drive the lead screws in appropriate directions so as to move the platform means upwardly and downwardly.

The platform means 14 is in a lower position as shown in FIG. 8. In this position, the fingers 88 penetrate the sockets 92 and the upright pin 116 engages the indexing socket 121. The fingers 88 successively engage and pick off the nut blanks 12 from the pick-off holder 62 as the transfer segment 92 is advanced by the indexing arm 108 through the loading station. As set forth in detail below, the platform means 14 is subsequently raised to an upper position at which time the tapping operation occurs and the indexing arm 108 returns to the loading station.

MODE OF OPERATION

When the apparatus is in operation, nut blanks 12 are supplied in a randomly dispersed manner from the hopper 16 onto the pan 18. The vibratory means (not shown) advance the nut blanks toward the conveyor track 20 formed by the tracks 34. The nut blanks are then transferred along the slide surfaces 36 and 38 of the tracks 34 in a cantilever-type arrangement and they are successively engaged by the guide plates 42 and 46.

When the nut blanks 12 engage the guide plates 42, those nut blanks presenting their lateral dimension in a vertical direction are repositioned in a proper orientation or discharged into the spaces 35. Thereafter, the nut blanks engage the guide plates 46 and those nut blanks not presenting a proper upper surface configuration are discharged by the guide plates into the spaces 35. The discharged, improperly oriented, nut blanks are received in the pan 54 and advance to the return trough 56. These nut blanks are subsequently returned to the hopper 16 for recycle.

The properly oriented nut blanks advance along the slide surfaces 36 and 38 to the slide recess 58 where they are merged into a single file. Each of the slide recesses 58 is aligned with a chute 60 for delivery of the nut blanks to the pick-off battery 62. The rate of nut blank feed from the hopper 16 is preferably such that the slide recesses 58 are maintained with an adequate loading of nut blanks to provide a smooth and continuous gravity feed in the chutes 60.

The nut blanks 12 are delivered through the chutes 60 to the pick-off holders 64 where they are aligned within the forwardly inclined channels 82. Adjacent the pick-off position 83, the lead spring gripping members 76 and 80 and the bottom guide plate 74 releasably retain the nut blank in a forwardly tipped attitude exposing the open-centered underside of the nut blank.

The platform means 14 is in a lowered position during the loading cycle. At this time, the fingers 88 penetrate through the sockets 90 and extend thereabove a predetermined distance sufficient to engage the open-centered undersides of the nut blanks 12 retained at the pick-off position. The upright pin 116 of the indexing arm 108 is engaged within the indexing socket 118 adjacent the loading station of the indexing plate 120. Thus, as the indexing arm advances the transfer segment 92, each of the fingers 88 pick off and guide a nut blank into its associated socket. The pick-off battery 62 extends across the entire width of the path of the transfer segment 92. The nut blanks are presented to the fingers along a line passing through the center of the concentric circles defined by the sockets 90 as they are advanced.

The transfer segment is advanced to the next station which is a penetration terminating or idle station. At this time, the lead screws are engaged and the platform means 14 is raised. The raising of the platform means terminates the penetration of the sockets 90 by the fingers 88 and the indexing arm 108 returns to the loading station.

At the work station, which is one station in advance of the penetration terminating idle station, the nut blanks are being simultaneously tapped by a multiple spindle tapping head (not shown). The tapping operation occurs during the upward travel of the platform means 14 and it is completed when the platform means reaches a desired upper limit. The lead screws are then reversed causing the platform means to travel in a downward direction to a lower limit. When the lower limit of travel of the platform means 14 is reached, the taps (not shown) are completely disengaged from the nut blanks 12.

At this time the upright pin 116 will be received in one of the sockets 121 adjacent the loading station. The fingers 88 are in socket-penetrating engagement with the sockets of the transfer segment 92 which is adjacent the loading station. The cycle is then repeated and the transfer segments 92 retained within each of the apertures 122 are simultaneously advanced in an endless path.

As the transfer segment adjacent the loading station is advanced, the nut blanks which have been tapped and are located in the transfer segment adjacent the work station are simultaneously advanced to an unloading station. At the unloading station the stationary plate 94 has a cut away or relieved portion 150 as has the lead screw plate 124 and all other intermediate plates, and the tapped nut blanks drop downwardly through the sockets 90 into a receiving bin (not shown).

The invention is not restricted to the slavish imitation of each and every detail set forth above. Obviously, techniques may be provided which changed, eliminate, or add certain specific details without departing from the scope of the invention.

What is claimed is:

1. Apparatus for providing successive planar arrays of scores of open-centered workpieces such as nut blanks or the like for presentation at and subsequent removal from a work station at which the workpieces of each array may be simultaneously worked, as by multiple spindle tapping or the like, comprising a train of socket-defining segments, means to intermittently advance the segments of the train in succession past a loading station and then to a work station, means at the loading station to promptly and successively on demand deliver workpieces to, that is, replace workpieces at, each of a plurality of pick-off holders in which the workpieces are forwardly tipped in the feed direction of the train, the plurality of pick-off holders being distributed across the width of the path of the train of socket-defining segments, each segment defining a planar array of scores of workpiece-receiving sockets which open through the segment with each of said sockets being positioned to pass directly under one of said pick-off holders, an array of scores of fingers associated with the loading station and corresponding to the planar arrays of sockets of passing segments, means for causing the sockets of such segment to be penetrated by the fingers prior to passage of the sockets under the pick-off holders, for thence advancing the socket-penetrating fingers along the segment to engage the fingers with the rearwardly facing open-centered undersides of the promptly replaceable forwardly tipped open-centered workpieces and to successively pick off a number of workpieces, one to each finger, from each holder and guide them into the sockets successively passing directly thereunder during the advance of the associated segment, and for terminating the penetration of the sockets of the associated segment by the fingers prior to working of the workpieces held by such segment.

2. Apparatus as set forth in claim 1 wherein said means for causing said penetration, advancing, and terminating the penetration of said sockets comprises power means to move such socket-defining segment and said fingers together to socket-penetrating engagement, and indexing means to advance said socket-penetrating fingers along with said segment.

3. Apparatus as set forth in claim 2 wherein said indexing means cooperates in timed relationship with said power means to position said fingers apposite said sockets prior to socket-penetrating engagement, and wherein said power means moves said segment to said socket-penetrating engagement in an engaging direction transverse to said path of said train of socket-defining segments.

4. Apparatus as set forth in claim 3 wherein said engaging direction lies in a plane substantially perpendicular to a plane passing through said path of said train of socket-defining segments.

5. Apparatus as set forth in claim 3 wherein said indexing means includes finger support means and said finger support means is spaced below said train of socket-defining segments.

6. Apparatus as set forth in claim 5 wherein said indexing means includes an indexing arm and said finger support means includes a shuttle plate mounted on said indexing arm.

7. Apparatus as set forth in claim 6 wherein said shuttle plate is resiliently mounted on said indexing arm.

8. Apparatus as set forth in claim 6 wherein said train of socket-defining segments is supported in a platform means and said path of said train of socket-defining segments moves in an endless path.

9. Apparatus as set forth in claim 8 wherein said array of scores of workpiece-receiving sockets define a plurality of concentric circles as said train is advanced, and said pick-off holders present said workpieces to said fingers along a line passing through the center of said concentric circles.

10. Apparatus as set forth in claim 8 wherein said power means includes lead screw means in screw-jacking association between a stationary support means and said platform means, said lead screw means being rotatable in a first direction to provide said socket-penetrating engagement and rotatable in a second direction to terminate socket-penetrating engagement.

* * * * *